US004961836

United States Patent [19]

Murphy

[11] Patent Number: 4,961,836
[45] Date of Patent: Oct. 9, 1990

[54] SYNTHESIS OF TRANSITION METAL ALUMINO-SILICATE IOZ-5 AND USE OF IT FOR HYDROCARBON CONVERSION

[75] Inventor: William J. Murphy, Brights Grove, Canada

[73] Assignee: Exxon Research and Engineering Company, Florham Park, N.J.

[21] Appl. No.: 320,121

[22] Filed: Mar. 7, 1989

Related U.S. Application Data

[62] Division of Ser. No. 866,305, May 23, 1986, abandoned.

[51] Int. Cl.$^5$ .............................................. C10G 47/20
[52] U.S. Cl. ........................................ 208/111; 502/64
[58] Field of Search ................. 208/111, 181, 120; 585/739; 502/64

[56] References Cited

U.S. PATENT DOCUMENTS

| | | | |
|---|---|---|---|
| 3,394,988 | 7/1968 | Fishwick | 23/110 |
| 3,403,975 | 10/1968 | Frilette et al. | 23/198 |
| 3,578,398 | 5/1971 | Jenkins | 23/113 |
| 3,687,839 | 8/1972 | Jenkins | 201/111 |
| 3,755,538 | 8/1973 | Albers et al. | 423/329 |
| 3,941,871 | 3/1976 | Dwyer et al. | 423/326 |
| 3,968,024 | 7/1976 | Gorring et al. | 208/111 |
| 3,976,744 | 8/1976 | Granquist | 423/118 |
| 4,086,186 | 4/1978 | Rubin et al. | 252/430 |
| 4,089,929 | 5/1978 | Christophliemk et al. | 423/118 |
| 4,100,262 | 7/1978 | Pelrine | 423/329 |
| 4,208,305 | 6/1980 | Kouwenhoven et al. | 252/431 |
| 4,234,380 | 11/1980 | Kihlstedt et al. | 162/152 |
| 4,238,318 | 12/1980 | Kouwenhoven et al. | 208/120 |
| 4,259,174 | 3/1981 | Chen et al. | 208/111 |
| 4,287,166 | 9/1982 | Dwyer et al. | 423/325 |
| 4,329,328 | 5/1982 | McAnespie et al. | 423/333 |
| 4,337,176 | 6/1982 | Boersma et al. | 252/459 |
| 4,339,353 | 7/1982 | Neisz et al. | 208/120 |
| 4,371,628 | 2/1983 | Nanne et al. | 518/713 |
| 4,372,930 | 2/1983 | Short et al. | 423/326 |
| 4,376,757 | 3/1983 | Hennenkamp et al. | 423/332 |
| 4,397,825 | 8/1983 | Whittam | 423/277 |
| 4,401,637 | 8/1983 | Marosi et al. | 423/329 |

(List continued on next page.)

FOREIGN PATENT DOCUMENTS

| | | |
|---|---|---|
| 010572 | 5/1980 | European Pat. Off. . |
| 014059 | 6/1980 | European Pat. Off. . |
| 013630 | 7/1980 | European Pat. Off. . |
| 030751 | 6/1981 | European Pat. Off. . |
| 038682 | 10/1981 | European Pat. Off. . |
| 040016 | 11/1981 | European Pat. Off. . |
| 059059 | 9/1982 | European Pat. Off. . |
| 063436 | 10/1982 | European Pat. Off. . |
| 065401 | 11/1982 | European Pat. Off. . |
| 115031 | 8/1984 | European Pat. Off. . |
| 118382 | 9/1984 | European Pat. Off. . |
| 136067 | 4/1985 | European Pat. Off. . |
| 136068 | 4/1985 | European Pat. Off. . |
| 142355 | 5/1985 | European Pat. Off. . |
| 145094 | 6/1985 | European Pat. Off. . |
| 7007821 | 1/1982 | Japan . |
| 7011818 | 1/1982 | Japan . |
| 8110421 | 7/1983 | Japan . |
| 9174519 | 3/1984 | Japan . |
| 9184722 | 10/1984 | Japan . |
| 9184723 | 10/1984 | Japan . |
| 8103532 | 1/1983 | Netherlands . |
| 504854 | 10/1985 | PCT Int'l Appl. . |
| 678436 | 9/1952 | United Kingdom . |
| 1413470 | 11/1975 | United Kingdom . |
| 1188043 | 4/1977 | United Kingdom . |
| 2033358 | 5/1980 | United Kingdom . |
| 2078704 | 1/1982 | United Kingdom . |
| 2144727 | 3/1985 | United Kingdom . |

OTHER PUBLICATIONS

"Synthetic Offretite–Physicochemical Characterization", Whyte et al., Journal of Catalysis 20 88–96, 1971.

(List continued on next page.)

Primary Examiner—Anthony McFarlane
Attorney, Agent, or Firm—Joseph J. Allocca

[57] ABSTRACT

This invention relates to a novel transition metal crystalline alumino-silicate, a method for its preparation and its use, and to a transition metal extracted crystalline alumino-silicate, a method for its preparation from the aforesaid transition metal crystalline alumino-silicate and its use as a catalyst, especially for selective dewaxing of hydrocarbon oils. The transition metal crystalline alumino-silicate and the transition metal extracted crystalline alumino-silicate are characterized by XRD patterns set forth in Table I.

9 Claims, 7 Drawing Sheets

U.S. PATENT DOCUMENTS

| | | | |
|---|---|---|---|
| 4,405,502 | 9/1983 | Klotz | 252/455 |
| 4,405,504 | 9/1983 | Klotz | 423/458 |
| 4,420,467 | 12/1983 | Whittam | 423/328 |
| 4,443,552 | 4/1984 | Iida et al. | 502/66 |
| 4,446,008 | 5/1984 | Shimakawa et al. | 208/111 |
| 4,450,312 | 5/1984 | Lake et al. | 585/481 |
| 4,462,971 | 7/1984 | Hennenkamp et al. | 423/277 |
| 4,481,173 | 11/1984 | Chu | 423/277 |
| 4,501,926 | 2/1985 | LaPierre et al. | 585/739 |
| 4,518,485 | 5/1985 | LaPierre et al. | 585/89 |
| 4,521,297 | 6/1985 | Angevien et al. | 208/89 |
| 4,734,539 | 3/1988 | Lawlor | 585/739 |
| 4,776,946 | 10/1988 | Moorehead | 208/18 |
| 4,788,378 | 11/1988 | Chang et al. | 585/739 |
| 4,818,369 | 4/1989 | Bortz | 208/111 |

OTHER PUBLICATIONS

"Spectroscopic Studies of Zeolite Synthesis", McNicol et al., Journal of Physical Chemistry 76, No. 23, 1972.

"Synthesis and Characterization of a New Zeolite of the Offretite Type", Occelli et al.; 183 ACS Nat. Meet. ACSDIV PET CHEM Prep. 27 #2, 452–46P 1982.

425°C

600°C

700°C

SYNTHESIS OF TRANSITION METAL ALUMINO-SILICATE IOZ-5 AND USE OF IT FOR HYDROCARBON CONVERSION

This is a division of application Ser. No. 866,305, filed May 23, 1986, now abandoned.

BACKGROUND OF THE INVENTION

1. Field of the Invention

This invention relates to a novel transition metal crystalline alumino-silicate, a method for its preparation, its use; and to a transition metal-extracted crystalline alumino-silicate, a method for its preparation from the aforesaid transition metal crystalline alumino-silicate and its use as a catalyst, especially for selective dewaxing of hydrocarbon oils.

2. Brief Description of Disclosures in the Art

Zeolite materials, both natural and synthetic, have been demonstrated in the past to have catalytic properties for various types of hydrocarbon conversions. Certain zeolitic materials are ordered, porous crystalline alumino-silicates having a definite crystalline structure within which there are a large number of smaller cavities which may be interconnected by a number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline alumino-silicates. These alumino-silicates can be described as a rigid, three-dimensional framework of $SiO_4$ and $AlO_4$ in which the tetrahedra are cross-linked by the sharing of oxygen atoms, whereby the ratio of the total aluminum and silicon atoms to oxygen is 1:2. The electrovalence of the tetrahedra-containing aluminum is balanced by the inclusion in the crystal of a cation, for example, an alkali metal or an alkaline earth metal cation. This can be expressed wherein the ratio of aluminum to the number of various cations, such as Ca, Sr, Na, K or Li, is equal to unity. One type of cation may be exchanged either entirely or partially by another type of cation utilizing ion exchange techniques in a conventional manner. By means of such cation exchange it has been possible to vary the properties of a given alumino-silicate by suitable selection of the cation. The spaces between the tetrahedra are occupied by molecules of water prior to dehydration.

Prior art techniques have resulted in the formation of a great variety of synthetic alumino-silicates. These alumino-silicates have come to be designed by letter or other convenient symbols, as illustrated by Zeolite A, U.S. Pat. No. 2,882,243; Zeolite X, U.S. Pat. No. 2,882,244; Zeolite Y, U.S. Pat. No. 3,130,007; Zeolite ZK-5, U.S. Pat. No. 3,247,195; Zeolite ZK-4, U.S. Pat. No. 3,314,752; and Zeolite ZSM-5, U.S. Pat. No. 3,702,886, to name a few.

Prior art techniques have also resulted in the formation of a variety of synthetic transition metal silicates and alumino-silicates, as described in, for example, U.S. Pat. Nos. 4,208,305; 4,376,757; European Patent Application Nos. 0,014,059, 0,013,630, 0,030,751; and U.S. Pat. No. 4,100,262.

A crystalline alumino-silicate zeolite known in the art is offretite. The IOZ-5 zeolite of the present invention resembles offretite in certain aspects of structure, but differs therefrom by having a notably higher silica/alumina ratio, and having associated transition metals incorporated during synthesis. These transition metals impart morphological effects, including particle size range of 0.1–0.25 microns, which further differentiates IOZ-5 from offretite.

SUMMARY OF THE INVENTION

Figure 1:
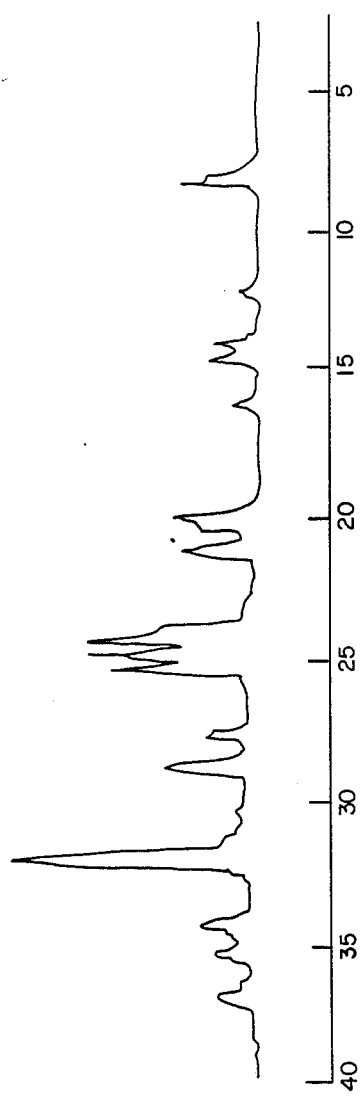
FIG. 1 is an x-ray diffraction pattern of a typical Iron T-IOZ-5 zeolite of the present invention.

The present invention is directed to a novel synthetic crystalline transition metal alumino-silicate, hereinafter designed T-IOZ-5, and to a method for its preparation and use. The composition is useful as a catalyst in hydroconversion processes, including hydrocracking. The T-IOZ-5 composition has a characteristic diffraction pattern, the values of which are set forth in Table I.

By this invention there is provided a crystalline transition metal alumino-silicate composition having incorporated therein at least one transition metal selected from Groups IIIB, IVB, VB, VIB, VIIB, VIII, IB, IIB or mixtures thereof of the Periodic Table of Elements and exhibiting an x-ray powder diffraction pattern which shows the significant lines as set forth in Table I, and which can be further identified in terms of mole ratios of oxides in the anhydrous state as follows:

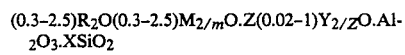

$(0.3–2.5)R_2O(0.3–2.5)M_{2/m}O.Z(0.02–1)Y_{2/z}O.Al_2O_3.XSiO_2$ wherein R is a tetramethylammonium cation or choline cation; M is an alkali metal cation, or mixtures of alkali metal cations or mixtures of alkali metal and alkaline earth metal cations, preferably potassium or potassium mixed with other alkaline cations or alkaline earth cations or hydrogen; X is at least 5; Y is a transition element or combination of transition elements; Z is the valence of said transition element; and m is the valency of the alkali or alkaline earth element.

Further provided is a method for preparing the above-described composition comprising the steps of:

(a) preparing a mixture containing sources of: tetramethylammonium oxide or choline oxide; alkali metal oxide; aluminum oxide; silicon oxide; an oxide of a transition metal selected from Groups IIIB, IVB, VB, VIB, VIIB, VIII, IB or IIB of the Periodic Table of Elements and water, said gel mixture having a composition in terms of mole ratios of oxides falling within the ranges:

| | |
|---|---|
| $R_2O/R_2O + M_2O$ | 0.04–0.7 |
| $H_2O/SiO_2$ | 11–35 |
| $R_2O + M_2O/SiO_2$ | 0.1–0.9 |
| $SiO_2/Al_2O_3$ | >10 |
| Y/Al | 0.05 | wherein R is tetramethylammonium or choline and M is potassium or a mixture of alkali metals or alkaline earth metals, including potassium or hydrogen; and (b) maintaining the mixture at a temperature of between about 80° C. to about 160° C., preferably up to about 145° C., for a time sufficient for crystals of said transition metal alumino-silicate to be formed. If the mixture is slowly heated, a temperature up to about 180° C. can be utilized, the mixture being maintained at this temperature until crystals of the transition metal alumino-silicate are formed. For the purposes of this specification, by slow heating is meant heating at a rate of about 1° C. per minute.

Also provided is a crystalline alumino-silicate composition having the formula in the anhydrous state, in terms of mole ratios of oxides, as follows:

$$QR_2O.(1-Q)M_{2/m}O.Al_2O_3.XSiO_2$$

wherein R is a tetramethylammonium cation or a choline cation; M is potassium or a mixture of potassium plus other alkali, alkaline earth metal cations or hydrogen; m is the metal valence; X is about 5 or more, preferably about 8 or more, most preferably at least 12; and Q is 1±0.4; said zeolite being characterized by exhibiting an x-ray diffraction pattern showing the significant lines as set forth in Table I which crystalline alumino-silicate composition is produced by substantially extracting the transition metal out of the T-IOZ-5 composition described above, (a crystalline transition metal alumino-silicate having at least one transition metal selected from Groups IIIB, IVB, VB, VIB, VIIB, VIII, IB, IIB of the Periodic Table of Elements and exhibiting an x-ray powder diffraction pattern which itself shows the significant lines as set forth in Table I).

Further provided is a process for producing the above-described composition comprising the step of contacting the crystalline transition metal alumino-silicate T-IOZ-5 having at least one transition metal selected from Groups IIIB, IVB, VB, VIB, VIIB, VIII, IB, IIB or mixtures thereof of the Periodic Table with a transition metal extraction agent to substantially remove such transition metal, yielding an alumino-silicate material identified herein as IOZ-5.

Additionally provided is a process for selective hydrocracking a hydrocarbon mixture using the transition metal extracted T-IOZ-5 comprising the step of contacting said hydrocarbon mixture, in the presence of hydrogen gas with a catalyst composition comprising crystalline alumino-silicate IOZ-5 having a silica:alumina ratio of at least 5:1, preferably 8:1, most preferably about 12:1, said IOZ-5 alumino-silicate being characterized by exhibiting an x-ray diffraction pattern showing the significant lines as set forth in Table I, under typical hydrocracking conditions, i.e., a temperature in the range of about 200°–550° C., a pressure in the range of about 1.0–18 MPa, a gas hourly space velocity of about 0.1 to 20 v/v/hr., and a hydrogen gas treating rate of about 20–4,000 $M^3$ API/$m^3$.

DESCRIPTION OF THE INVENTION AND PREFERRED EMBODIMENTS

The subject T-IOZ-5 composition is characterized by a specific x-ray diffraction pattern and the presence of transition metal and can be further identified in terms of mole ratios of oxides in the anhydrous state as follows:

$$(0.3-2.5)R_2O.(0.3-2.5)M_{2/m}O.Z(0.02-1)Y_{2/z}O.Al_2O_3.XSiO_2$$

wherein R is a tetramethylammonium cation or choline cation; M is an alkali metal cation, preferably being potassium or a mixture of alkali metals containing potassium or a mixture of alkaline metal cations and alkaline earth metal cations including potassium; X is at least 5; Y is a transition element or combination of transition elements; Z is the valency of said transition element; and m is the valency of the alkali or alkaline earth element.

A preferred formula of the synthesized form of the subject zeolite in terms of ratios of oxides and in the anhydrous state is as follows:

$$(0.3-2.5)R_2O.(0.4-2.5)M_{2/m}O.Z(0.02-1)Y_{2/z}O.Al_2O_3.(5-18)SiO_2$$

wherein R is a tetramethylammonium cation; M is potassium or a mixture of alkali metals, one of which is potassium; Y is a transition element or mixture of such elements; Z is the valency of said transition element; and m is the valency of the alkali or alkaline earth element.

The synthetic T-IOZ-5 zeolite possesses a definite distinguishing crystalline structure whose x-ray diffraction pattern shows substantially the significant lines set forth below in Table I.

Table I is a presentation of a general XRD pattern representative of a number of samples of T-IOZ-5 equilibrated for more than 16 hours over water saturated calcium chloride taken as an average with the spread in data also presented. In the dried or dehydrated state the spread in data can be ±0.5 at each line. Hereafter, in the text the data represents the equilibrated materials unless otherwise noted.

TABLE I

| 2 Times Theta | Relative* Intensity I/Io |
|---|---|
| 7.8 + .2 − .1 | 39.3 |
| 11.8 ± .1 | 11.4 |
| 13.5 + .2 − .1 | 12.1 |
| 14.1 + .2 − .1 | 10.8 |
| 15.6 + .2 − .1 | 13.8 |
| 19.6 ± .1 | 34.6 |
| 20.7 ± .1 | 39.2 |
| 23.5 ± .3 − .1 | 47.1 |
| 23.8 + .5 − .1 | 77.3 |
| 24.9 + .2 − .1 | 62.7 |
| 27.2 + .1 − .2 | 25.4 |
| 28.4 + .2 − .1 | 32.7 |
| 30.7 + .1 | 11.2 |

TABLE I-continued

| 2 Times Theta | Relative* Intensity I/Io |
|---|---|
| 31.5 + .2 / − .4 / − .1 | 100.0 |
| 33.7 ± .1 | 23.3 |
| 34.5 + .3 / − .4 | 12.6 |
| 35.7 + .2 / − .1 | 9.2 |
| 36.3 + .1 / − .2 | 22.2 |

*Diffractometer fitted with automatic divergence slit.

Table IA is the XRD pattern for TMA offretite. This pattern is for the TMA offretite produced in Example 3 following.

TABLE 1A

| 2θ | d | Height (Arbitrary Units) |
|---|---|---|
| 7.716 | 11.458 | 26.2 |
| 11.707 | 7.559 | 6.7 |
| 13.413 | 6.601 | 16.2 |
| 14.036 | 6.310 | 5.1 |
| 15.502 | 5.716 | 9.3 |
| 19.467 | 4.560 | 19.3 |
| 20.560 | 4.320 | 28.2 |
| 23.369 | 3.807 | 24.7 |
| 23.716 | 3.752 | 54.3 |
| 24.827 | 3.586 | 38.0 |
| 26.169 | 3.405 | 1.5 |
| 27.040 | 3.297 | 16.4 |
| 28.320 | 3.151 | 20.0 |
| 30.604 | 2.921 | 6.8 |
| 31.431 | 2.846 | 63.1 |
| 33.529 | 2.673 | 16.1 |
| 34.196 | 2.622 | 1.3 |
| 35.707 | 2.515 | 3.7 |
| 36.231 | 2.479 | 14.2 |
| 38.627 | 2.352 | 1.7 |
| 39.458 | 2.284 | 3.9 |
| 41.040 | 2.199 | 7.7 |

The values in both Table I and Table IA were determined by standard techniques. The radiation was the K-alpha doublet of copper, and a scintillation counter spectrometer with a strip chart pen recorder was used. It is noted that the spectrometer (diffractometer) was fitted with an automatic divergance slit. The peak heights, I, and the position as a function of 2 times theta where theta is the Bragg angle were read from the spectrometer chart. From these the relative intensities, 100 I/Io, where Io is the intensity of the strongest line or peak, and d (obs) the interplanar spacing in Angstroms (A), corresponding to the recorded lines, were calculated. It should be understood that this x-ray diffraction pattern is characteristic of all the species of T-IOZ-5 and IOZ-5 compositions. Ion exchange of the potassium ion with cations reveals substantially the same pattern with some minor shifts in interplanar spacing and variation in relative intensity. Other minor variations can occur depending on the silicon to aluminum ratio of the particular sample, as well as if it has previously been subjected to thermal treatment.

Synthetic T-IOZ-5 zeolites can be used in a wide variety of hydrocarbon conversion reactions, for example, Fischer-Tropsch synthesis, polymerization, aromatization, cracking and hydrocracking. Other hydrocarbon conversion processes for which T-IOZ-5 may be utilized in one or more of its active forms include, for example, alkylation and converting light aliphatics to aromatics.

Synthetic T-IOZ-5 zeolites can be used either in the alkali metal or hydrogen form, or other univalent or multivalent cationic forms. They can also be used in intimate combination with a hydrogenating component, such as tungsten, vanadium, molybdenum, rhenium, nickel, cobalt, chromium, manganese or a noble metal, such as platinum or palladium, etc., where a hydrogenation-dehydrogenation function is to be performed. Such components can be exchanged into the composition, impregnated therein or physically intimately admixed therewith. Such components can be impregnated in or onto T-IOZ-5, such as, for example, by, in the case of platinum, treating the zeolite with a platinum metal-containing ion. Suitable platinum compounds for this purpose include chloroplatinic acid, platinous chloride and various compounds containing the platinum amine complex. Various combinations of metals and various methods for their introduction can be used.

Synthetic T-IOZ-5, when employed as either an adsorbent or as a catalyst, should be dehydrated at least partially. This can be done by heating to a temperature in the range of 200° C. to 600° C. in an inert atmosphere, such as air, nitrogen, etc., and at atmospheric or subatmospheric pressures for between about 1 and 48 hours. Dehydration can also be performed at lower temperature merely by placing the catalyst in a vacuum, but a longer time is required to obtain a sufficient amount of dehydration.

Zeolite T-IOZ-5 can be suitably prepared by preparing a solution of alkali metal cation source or mixture of alkali metal cation and alkaline earth metal cation sources (e.g., potassium oxide or mixtures of potassium oxide and other alkali metal oxides or alkaline earth metal oxides, etc.) an oxide of silicon, a transition metal oxide or salt and water and having a composition in terms of molar ratios of oxides falling within the following ranges listed below in Table II:

TABLE II

| Molar Ratios | Broad | Preferred | Most Preferred |
|---|---|---|---|
| $\dfrac{(R_2O)}{(R_2O + M_2O)}$ | 0.04–0.7 | 0.05–0.5 | 0.1 |
| $\dfrac{(H_2O)}{(SiO_2)}$ | 11–35 | 14–30 | 20–25 |
| $\dfrac{(R_2O + M_2O)}{(SiO_2)}$ | 0.1–0.9 | 0.2–0.8 | 0.4 |
| $SiO_2/Al_2O_3$ | >10 | 15–40 | 20–35 |
| Y/Al | >0.05 | 0.3–3.0 | 0.7–1.5 | wherein R is tetramethylammonium cation; M is an alkali metal cation or mixtures of alkali metal ions (preferably containing potassium) or a mixture of alkali metal ions and alkaline earth metal cations (wherein at least one of the alkali metal ions is preferably potassium); and Y is a transition metal and maintaining the mixture until crystals of the zeolite are formed. Thereafter the crystals are separated from the liquid and recovered. Typical reaction conditions consist of heating the foregoing reaction mixture at a temperature of at least about 80° C. for a period of two days to 30 days. Increasing temperature reduces the reaction time, while decreasing temperature increases the time taken for crystallization. Excessively high temperatures are preferably avoided, maximum temperatures of about 160° C. and less being preferred if rapid heating of the mixture is employed (as, for example, the mixture being inserted into a preheated oven). If slow heating is employed a maximum temperature of about 180° C. can be utilized, slow heating for the purposes of this specification being heating at 1° C. per minute.

The digestion of the gel particles is carried out until crystals are formed. The solid product is separated from the reaction medium, as by cooling the whole to room temperature, filtering and water washing.

The crystalline product is dried, e.g., at 120° C., for from about 8 to 24 hours. Of course, milder conditions may be employed if desired, e.g., room temperature under vacuum, yielding similar results.

The composition for the synthesis of synthetic T-IOZ-5 can be prepared utilizing materials which can supply the appropriate oxide. Such compositions include aluminates, alumina, silicates, silica hydrosol, silica gel, silicic acid and hydroxides and transition metal nitrates, sulphates, double salts and transition metal amine complex salts, etc.

Particle size and crystallization time of the T-IOZ-5 composition will vary with the nature of the reaction mixture employed, and generally particle sizes in the order of <0.1 to 1.0 microns are obtained from the T-IOZ-5 synthesis.

The original cations of the synthesized T-IOZ-5 can be replaced in accordance with the techniques well known in the art, at least in part by ion exchange with other cations. Preferred cations in this regard include metal ions, ammonium ions, hydrogen ions and mixtures thereof. Particularly preferred cations are those which render the zeolite catalytically-active, especially for hydrocarbon conversion. These include hydrogen, hydrogen precursors (e.g., ammonium ions), rare earth metals, aluminum, metals of Groups IB, IIB, IIIB, VIB, IIA, IIIA, IVA and VIII of the Periodic Table of Elements and mixtures thereof.

Of the replacing metallic cations, particular preference is given to cations of metal, such as rare earth, Mn, Ca, Mg, Zn, Cd, Pt, Pd, Ni, Co, Ti, Al, Sn, Fe and Co.

Typical ion exchange techniques would include contacting the synthetic T-IOZ-5 zeolite with a salt of the desired replacing cation or cations. Although a wide variety of salts can be employed, particular preference is given to chlorides, nitrates and sulfates.

Representative ion exchange techniques for zeolites in general are disclosed in a wide variety of patents, including U.S. Pat. Nos. 3,140,249, 3,140,251 and 3,140,253.

Following contact with the salt solution of the desired replacing cation the transition metal molecular sieve is then preferably boil washed with water and dried at a temperature ranging from 60° C. to about 300° C. and thereafter may be calcined for from 1 to 48 hours or more at 260° C. to 800° C. in air or an inert atmosphere to produce a catalytically-active thermal decomposition product thereof.

Regardless of the cations replacing the alkali metal in the synthesized form of the T-IOZ-5, the spatial arrangement of the aluminum, silicon and oxygen atoms which form the basic crystal lattices of T-IOZ-5 remain essentially unchanged by the described replacement of alkali metal as determined by taking an x-ray powder diffraction pattern of the ion exchanged material.

The transition metal alumino-silicate prepared by the instant invention is formed in a wide variety of particle sizes. Generally speaking, the particles can be in the form of a powder, a granule, or a molded product, such as extrudate, having a particle size sufficient o pass through a 2 mesh (Tyler) screen and be retained on a 400 mesh (Tyler) screen. In cases where the catalyst is molded, such as by extrusion, the transition metal alumino-silicate can be extruded before drying or dried (or partially dried) and then extruded.

As in the case of many catalysts, it may be desired to incorporate the T-IOZ-5 with another material resistant to the temperature and other conditions employed in the contemplated processes. Such matrix materials include active and inactive materials and synthetic or naturally occurring zeolites, as well as inorganic materials, such as clays, silica and/or metal oxides, such as alumina. The latter may be either naturally occurring or in the form of gelatinous precipitates, sols or gels, including mixtures of silica and metal oxides. Use of a material in conjunction with the T-IOZ-5, i.e., combined therewith, which is active tends to improve the conversion and/or selectivity of the catalyst in certain organic conversion processes. Inactive materials suitably serve as diluents to control the amount of conversion in a given process so that products can be obtained economically and orderly without employing other means for controlling the rate of reduction. Frequently zeolite materials have been incorporated into naturally occurring clays, e.g., bentonite and kaolin. These materials, i.e., clays, oxides, etc., function in part as binders for the catalyst. It is desirable to provide a catalyst having good crush strength because in a petroleum refinery the catalyst is often subjected to rough handling which tends to break the catalyst down into powder-like materials which cause problems in processing.

Naturally-occurring clays, which can be composited with the synthetic T-IOZ-5 catalyst, include the montmorillonite and kaolin family, which families include the sub-bentonites, and kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials the T-IOZ-5 catalyst can be compositioned with a porous matrix material, such as silica-alumina, silica-magnesia, silica-zirconia, silica-thoria, silica-beryllia, silica-titania, as well as ternary compositions, such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline transition metal alumino-silicate T-IOZ-5 and inorganic oxide gel matrix vary widely with the crystalline alumino-silicate content ranging from about 1 to about 90 percent by weight and more usually in the range of about 2 to about 70 percent by weight of the composite.

Further provided by this invention is a new zeolite composition having silica/alumina molar ratio of about 5 and greater, preferably above about 12, having an x-ray diffraction pattern exhibiting the lines as set forth in Table I (that is, substantially the same pattern as for T-IOZ-5) and obtained by extracting the transition metal substantially out of T-IOZ-5, described herein, by a transition metal extracting agent, including EDTA-$H_4$, and mineral acid, e.g., hydrdochloric, yielding an alumino-silicate zeolite identified herein as IOZ-5. IOZ-5 materials having $SiO_2/Al_2O_3$ ratios of greater than 12 are produced by extracting the transition metal from T-IOZ-5 materials which themselves already possess $SiO_2/Al_2O_3$ ratios in excess of 12.

The crystalline alumino-silicate zeolite IOZ-5 can be substantially described in terms of its mole ratios of oxides in the anhydrous state and potassium form as:

where X is about 5 or more, preferably at least 12.

The alumino-silicate as formed by transition metal extraction of T-IOZ-5 has the composition in terms of moles of oxides (in the anhydrous state) as follows:

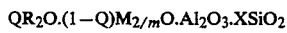

wherein R is hydrogen or hydrogen precursor, such as ammonium ion; M is potassium or a mixture of potassium plus other alkali or alkaline earth metal cations; m is the metal valency; X is about 5 or more, preferably at least 12; and Q is $1.0\pm0.4$ and is characterized by a powder x-ray diffraction pattern exhibiting the lines as presented in Table I. T-IOZ-5 and transition metal free IOZ-5 share substantially the same XRD pattern which in this specification is presented for both materials by Table I. The extracted IOZ-5 zeolite of the present invention finds use in a wide variety of catalytic conversion processes, including hydrocarbon cracking, hydrocracking, selective dewaxing, aromatization, etc.

The extracted IOZ-5 zeolite is substantially transition metal free, containing 0.1 weight percent or less thereof, and can be prepared from T-IOZ-5 by extraction using ethylenediamine tetraacetic acid (EDTA-$H_4$), for example, using a conventional Soxhlet reflux extraction procedure. More stringent conditions can be used by using a mineral acid, for example, 1.5M hydrochloric acid, in which not only is the transition metal extracted but a significant amount of dealumination occurs also.

Typical procedures for carrying out the extraction steps are adequately described in Example 20 (EDTA-$H_4$) and Example 25 (1.5M HCl). The resulting materials exhibit substantially the same x-ray powder diffraction pattern of the starting T-IOZ-5 precursor and substantially the same particle size. Use of the extraction step enables one to arrive at a family of materials of varying particle size having XRD patterns and $SiO_2/Al_2O_3$ ratios in the range of that of offretite but also to materials having silica/alumina ratios substantially higher than those obtained for offretite $SiO_2/Al_2O_3$ ratios greatly in excess of 12 being achievable. However, T-IOZ-5 is different from offretite by virtue of the fact that it has a heavy metal, such as iron, in framework positions. This results in a slightly different XRD pattern in which the line positions change as a result of differences in the Al-O and Fe-O bond lengths. Upon removing iron selectively from Fe-IOZ-5 to give IOZ-5 the result is the formation of vacancies or "holes" in the framework of the crystal at the sites that were previously occupied by iron. The framework is rigid enough to negate any redistribution of remaining aluminum over the crystal. Therefore, if a Fe-IOZ-5 with an $SiO_2/Al_2O_3$ ratio within the TMA offretite composition range, i.e., $SiO_2/Al_2O_3$ between 5 to 10–12, is treated to remove iron and thus give an iron-free IOZ-5 with $SiO_2/Al_2O_3$ ratio within said offretite composition range (i.e., $SiO_2/Al_2O_3$ of 5 to 10–12) this material will differ from offretite in that there will be holes in the structure due to vacated iron. These holes would not be present in TMA offretite. Thus, IOZ-5 is different than offretite.

The obtained extracted IOZ-5 can be dried, ion-exchanged, dried and calcined and deposited with catalytically active transition metals by the same procedures and conditions described above for T-IOZ-5. IOZ-5 material having $SiO_2/Al_2O_3$ ratios of 5:1, preferably 8:1, most preferably 12:1, and greater can be used for hydrocracking, especially selective dewaxing.

The following examples are illustrative of the best mode of carrying out the invention as contemplated by me but should not be construed as being limits or constraints on the scope and spirit of the instant invention.

EXAMPLE 1

Illustrating the preparation of iron T-IOZ-5 90.8 g potassium hydroxide (85 weight percent KOH), 15.6 g alumina and 267 g water were mixed and heated with stirring until the alumina dissolved and then cooled to room temperature. This was then added to 400 g Ludox LS (being an aqueous $\sim 30\%$ by weight $SiO_2$ colloidal silica sol—E. I. duPont) slowly with stirring and the stirring continued until the gel as formed appeared homogeneous. A solution of 19.7 g tetramethylammonium chloride in 100 g of water was then added slowly and with stirring. A solution of 36.9 g ferrous ammonium sulphate in 100 g water was added to the slurry. The synthesis gel composition in terms of moles/mole $Al_2O_3$ was:

| | |
|---|---|
| $SiO_2$ | 20 |
| $Al_2O_3$ | 1 |
| $(Me_4N)_2O$ | 0.9 |
| $K_2O$ | 7.1 |
| $Fe(NH_4)_2(SO_4)_2$ | 0.94 |
| $H_2O$ | 430 |

This total gel was then heated under quiescent conditions at $\sim 95°$ C. Crystallization was complete in 9 days, after which the product crystals were filtered out of solution and the product washed three times by boiling in water for 1 hour, followed by filtration.

This product was found to have the molar composition with $Al_2O_3$ taken conventionally as 1.0:

$Al_2O_3 = 1.0$ $SiO_2 = 13.3$ $K_2O/Al_2O_3 = 0.59$ $Fe/Al = 0.39$ $TMA_2O/Al_2O_3 = 0.75$

NOTE: The water content was not determined.

The XRD patterns of the crystalline product from Example 1 is shown in FIG. 1.

The crystalline product of Example 1 was calcined in air for 1 hour at each of 425° C., 600° C. and 700° C. The XRD patterns after calcining are shown in FIGS. 2, 3 and 4 as respectively.

X-ray analysis of the crystalline product showed the crystals to have the diffraction pattern substantially as listed in Table I.

Figure 2:
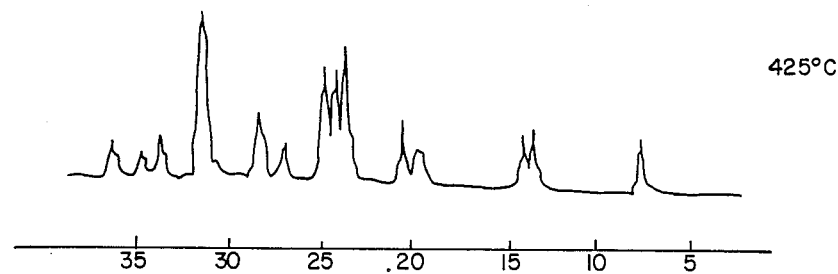
FIGS. 2, 3 and 4 presents XRD patterns of a sample of Iron IOZ-5 which has been calcined at three different temperatures for one hour.
Figure 3:
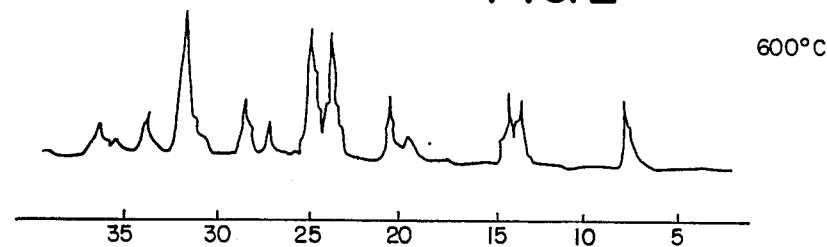
Figure 4:
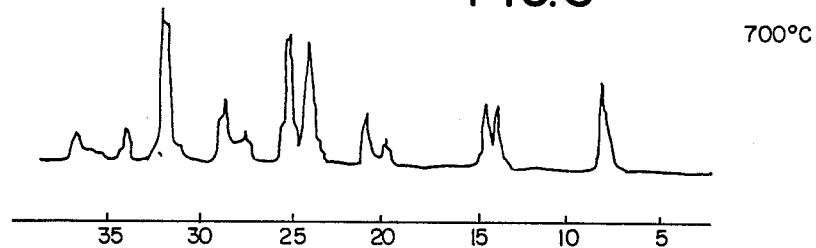

FIGS. 2, 3 and 4 to illustrate that as the calcination temperature increases the x-ray diffraction pattern of the product from Example 1 changed slightly from that listed in Table I to that listed in Table III, being representative of materials isostructural with offretite. This change in the x-ray diffraction patterns centered on the disappearance of the line at (2 theta) = ~24.3° as the calcination temperature is increased above 425° C.

TABLE III

| $2\theta$ | d | Height (Arbitrary Units) |
|---|---|---|
| 2.889 | 30.582 | 1.5 |
| 7.751 | 11.406 | 6.3 |
| 11.724 | 7.548 | 2.3 |
| 13.449 | 6.584 | 3.9 |
| 13.991 | 6.330 | 4.4 |
| 15.493 | 5.719 | 2.5 |
| 19.538 | 4.543 | 8.3 |
| 20.604 | 4.311 | 6.5 |
| 23.760 | 3.745 | 15.3 |
| 24.293 | 3.664 | 15.5 |
| 24.827 | 3.586 | 13.0 |
| 27.102 | 3.290 | 4.8 |
| 28.302 | 3.153 | 7.3 |
| 30.640 | 2.918 | 2.9 |
| 31.467 | 2.843 | 21.6 |
| 33.627 | 2.665 | 5.4 |
| 34.587 | 2.593 | 4.3 |
| 35.636 | 2.519 | 2.1 |
| 36.151 | 2.485 | 4.9 |
| 41.200 | 2.191 | 1.8 |

Scanning electron microscopy of the product from Example 1 indicated that the approximate average particle size was about 0.1 micron.

The adsorption capacity of the product from Example 1 was found to be 4.6 weight percent cyclohexane at 20 mm Hg and 20° C. This adsorption capacity was found to vary considerably from batch to batch from 4.6 to 8.0 weight percent, even though there was no significant difference in particle size or chemical composition of the products.

The product from Example 1 was ammonium exchanged in 400 g/L ammonium nitrate aqueous solution for 16 hours under stirred, reflux conditions. The product was washed free of nitrate and had the chemical composition in moles with $Al_2O_3$ as 1.0 as follows:

$SiO_2/Al_2O_3 = 13.6$ $K_2O/Al_2O_3 = 0.39$ $Fe/Al = 0.39$

The cyclohexane adsorption capacity at 20 mmHg and 20° C. was 7.1 weight percent.

The calcined product from Example 1 (calcined at 425° C., 600° C. and 700° C. for 1 hour each) was ammonium exchanged in 400 g/L ammonium nitrate aqueous solution for 16 hours under stirred reflux conditions. The product so formed was washed free of nitrate and had the chemical composition in moles with alumina taken as 1.0 as follows:

$SiO_2/Al_2O_3 = 14.1$ $K_2O/Al_2O_3 = 0.25$ $Fe/Al = 0.39$

EXAMPLE 2

In a procedure similar to that of Example 1 the following starting materials (weights in grams) were used:

| Alumina trihydrate | 10.4 |
|---|---|
| Potassium hydroxide | 60.3 |
| Ferrous ammonium sulphate | 24.6 |
| Tetramethylammonium chloride | 13.1 |
| Water | 311 |
| Ludox LS | 266.7 |

This gel was heated under quiescent conditions for 9 days at 100° C. The product so formed had an x-ray pattern substantially as that in Example 1. Chemical analysis showed this material to have the following molar composition (alumina = 1.0):

$SiO_2 = 13.6$ $K_2O/Al_2O_3 = 0.64$ $Fe/Al = 0.35$ $TMA_2O/Al_2O_3 = 0.75$

The water content was not measured.

EXAMPLE 3

A control experiment was performed to emphasize the effect of the transition metal in the synthesis described in Example 1.

90.8 g of KOH (85%) were dissolved in 267 g of water, 15.6 g of $Al_2O_3.3H_2O$ were added and the solution heated until the alumina dissolved. This was then cooled to room temperature before being added slowly with stirring to 400 gm Ludox 30. 19.7 g of tetramethylammonium chloride were dissolved in 200 gm of water and added slowly to the gel. This synthesis gel, in moles of oxide, was:

| $SiO_2$ | 20 |
|---|---|
| $Al_2O_3$ | 1 |
| $(Me_4N)_2O$ | 0.9 |
| $K_2O$ | 7.1 |
| $H_2O$ | 430 |

This gel was then placed in a 5 L, three neck boiling flask and stirred at 95° C. under reflux until crystallization was completed. Crystallization was monitored by removing 25 ml samples from the reaction mixture at intervals after an initial uninterrupted period of ~30 hours. Crystallization was complete after ~2 days.

TABLE IV

| $2\theta$ | d | Height (Arbitrary Units) |
|---|---|---|
| 7.716 | 11.458 | 26.2 |
| 11.707 | 7.559 | 6.7 |
| 13.413 | 6.601 | 16.2 |
| 14.036 | 6.310 | 5.1 |
| 15.502 | 5.716 | 9.3 |
| 19.467 | 4.560 | 19.2 |
| 20.560 | 4.320 | 28.2 |
| 23.369 | 3.807 | 24.7 |
| 23.716 | 3.752 | 54.4 |
| 24.827 | 3.586 | 38.0 |
| 26.169 | 3.405 | 1.5 |
| 27.040 | 3.297 | 16.4 |
| 28.320 | 3.151 | 20.0 |

TABLE IV-continued

| 2θ | d | Height (Arbitrary Units) |
|---|---|---|
| 30.604 | 2.921 | 6.8 |
| 31.431 | 2.846 | 63.1 |
| 33.529 | 2.673 | 16.1 |
| 34.196 | 2.622 | 1.3 |
| 35.707 | 2.515 | 3.7 |
| 36.231 | 2.479 | 14.2 |
| 38.267 | 2.352 | 1.7 |
| 39.458 | 2.284 | 3.9 |
| 41.040 | 2.199 | 7.7 |

Figure 5:
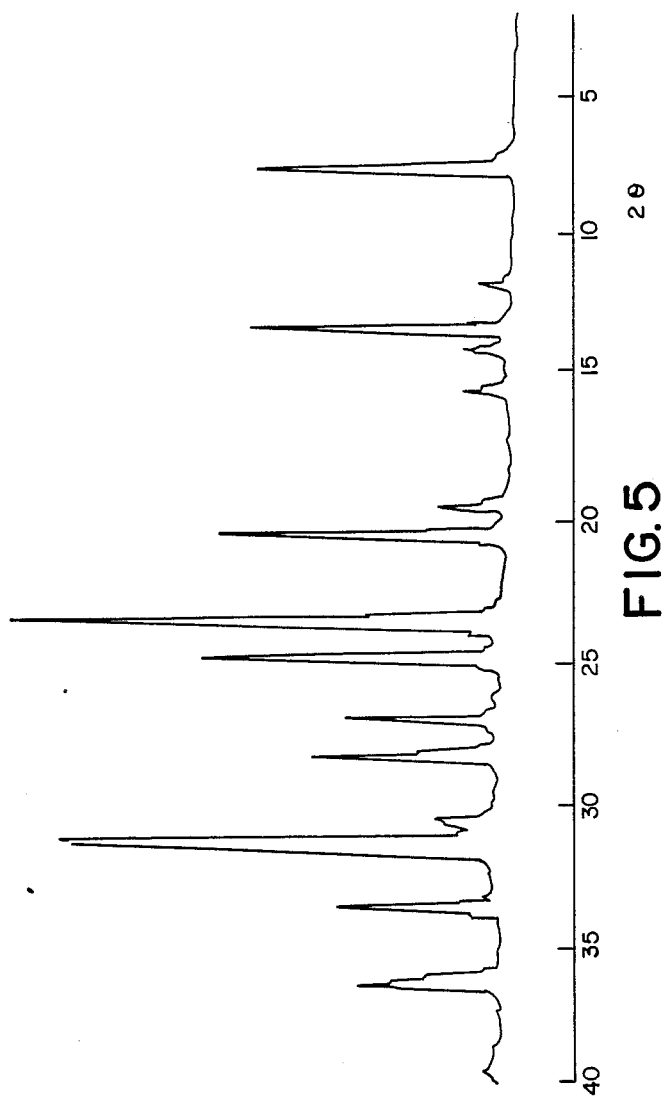
FIG. 5 presents the XRD pattern of TMA offretite.

The x-ray analyses of the crystalline product from Example 5 proved to have the diffraction pattern substantially of TMA offretite as listed in Table IV and as shown in FIG. 5. Chemical analysis showed this material to have the following composition:

$$0.56K_2O.0.46TMA_2O.Al_2O_3.10.0SiO_2.yH_2O$$

where y was not determined.

A scanning electron microscopy study of the product from Example 3 indicated the particle size to be about 1×0.5 microns "cigar" shaped particles. This is in agreement with the data published for "TMA offretite" (Whyte, T. E., Wu, E. L., Kerr, G. T., and Venuto, P. B., *J. Catal.* 20 88 (1971) Aiello, R., and Barrer, R. M., *J. Chem. Soc.* (A) 1470 (1970).

EXAMPLE 4

Figure 6:
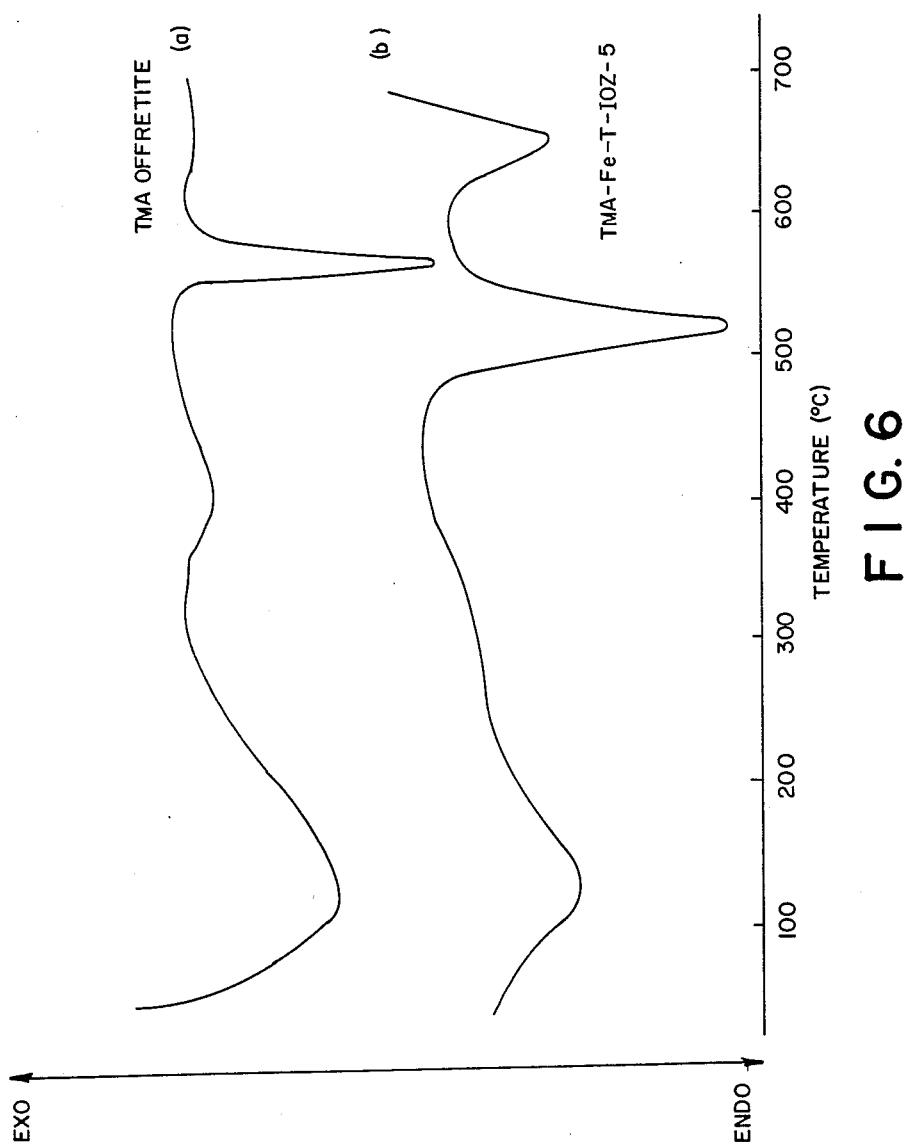
FIG. 6 presents comparison DTA patterns of TMA offretite and Iron IOZ-5.

Washed products from Examples 1 and 3 were each separately analyzed via differential thermal analyses (DTA) under nitrogen (35 mls/min., 10° C./min) which is a technique well known in the art [e.g., Whyte, T. E., et al., *J. Catal.* 20 88 (1971)]. FIG. 6 showed the results of this analysis. The DTA pattern of offretite is well known (*J. Catal.* 20, 88, 1971) and the data in FIG. 6(a) for TMA offretite (product of Example 3) agreed well with that in the literature. The DTA patterns of the products of Examples 1 and 3 showed considerably differences between the TMA offretite and the TMA-Fe-T-IOZ-5 in that the endotherms observed at 400° C. and 550° C. for TMA offretite (Example 3) were replaced by exotherms at 525° C. and 650° C. for TMA-Fe-T-IOZ-5 (Example 1, FIG. 6(b).

EXAMPLE 5

To further illustrate the preparation of iron T-IOZ-5, a synthesis gel was prepared as described in Example 1. This gel had the following molar composition:

| | |
|---|---|
| SiO₂ | 20 |
| Al₂O₃ | 1 |
| (Me₄N)₂O | 0.9 |
| K₂O | 7.1 |
| Fe(NH₄)₂(SO₄)₂ | 0.94 |
| H₂O | 430 |

This gel was heated under quiescent conditions for 144 hours at 125° C., 28 hours at 150° C. and 66 hours at 180° C. The product so formed was filtered from the mother liquor and washed as described in Example 1.

X-ray analysis of this crystalline product proved the crystals to have the diffraction pattern substantially as listed in Table V.

Chemical analyses showed the material to have the following oxide molar composition (alumina taken as 1.0):

$SiO_2 = 13.5$ $K_2O/Al_2O_3 = 1.0$ $Fe/Al = 0.50$ $TMA_2O/Al_2O_3 = 0.70$

The particle size of this product was found to be about 0.1 micron by scanning electron microscopy.

TABLE V

| 2θ | d | Height (Arbitrary Units) |
|---|---|---|
| 7.733 | 11.432 | 11.7 |
| 11.742 | 7.536 | 3.3 |
| 13.440 | 6.588 | 6.8 |
| 14.107 | 6.278 | 8.0 |
| 15.538 | 5.703 | 4.2 |
| 19.520 | 4.548 | 11.0 |
| 19.778 | 4.489 | 8.4 |
| 20.596 | 4.312 | 11.9 |
| 22.747 | 3.909 | 1.4 |
| 23.404 | 3.801 | 11.0 |
| 23.769 | 3.743 | 22.9 |
| 24.320 | 3.660 | 26.4 |
| 24.862 | 3.581 | 18.2 |
| 27.076 | 3.293 | 7.4 |
| 28.347 | 3.148 | 12.2 |
| 30.498 | 2.931 | 7.3 |
| 31.493 | 2.841 | 30.9 |
| 33.582 | 2.669 | 6.8 |
| 34.667 | 2.588 | 7.0 |
| 35.733 | 2.513 | 2.1 |
| 36.151 | 2.485 | 5.8 |
| 36.311 | 2.474 | 6.1 |
| 39.511 | 2.281 | 1.7 |
| 41.156 | 2.193 | 2.9 |

EXAMPLE 5A

Figure 10:
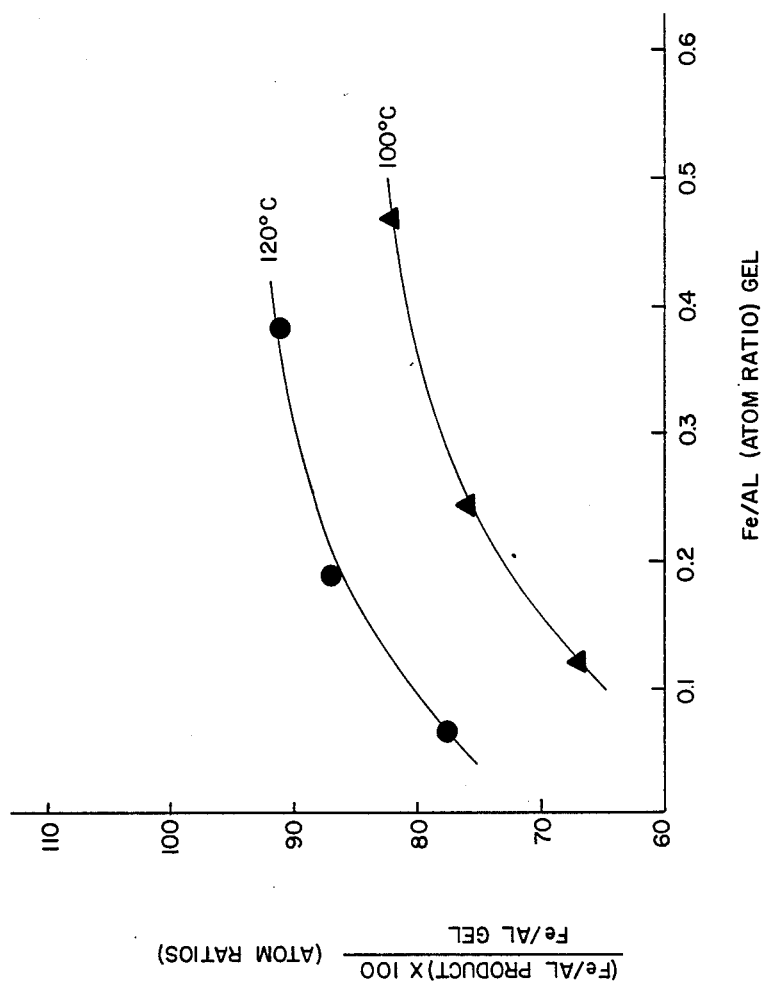
FIG. 10 shows the effect of iron to aluminum ratio in the gel on the incorporation of iron into Iron IOZ-5 at synthesis temperatures of 100° C. and 120° C.

FIG. 10 shows that as the Fe/Al atom ratio of the gel is increased from 0.05 to 0.5 the incorporation of iron in the zeolite increased at both 100° C. and 120° C. crystallization temperatures. At each temperature the percent of incorporation of iron appears to approach a limit at Fe/Al (atom ratio) of the gel >0.5.

EXAMPLE 6

In a procedure similar to that of Example 1, the following starting materials (weights in grams) were used:

| | |
|---|---|
| Alumina Trihydrate | 15.6 |
| Potassium Hydroxide | 90.8 |
| Ferrous Ammonium Sulphate | 30.0 |
| Tetramethylammonium Chloride | 59.1 |
| Water | 347 |
| Ludox LS | 400 |

This gel was heated under quiescent conditions for 96 hours at 120° C. The product so produced had an x-ray diffraction pattern substantially that in Table VI. Chemical analyses show this material to have the following molar composition (alumina taken as 1.0):

$SiO_2 = 12.1$ $K_2O/Al_2O_3 = 0.84$

Fe/Al=0.35

TMA$_2$O/Al$_2$O$_3$=0.71

TABLE VI

| 2θ | d | Height (Arbitrary Units) |
|---|---|---|
| 7.689 | 11.498 | 11.9 |
| 11.622 | 7.588 | 4.3 |
| 13.413 | 6.601 | 6.2 |
| 14.018 | 6.318 | 3.2 |
| 15.520 | 5.709 | 4.5 |
| 19.476 | 4.558 | 12.5 |
| 20.587 | 4.314 | 12.3 |
| 23.431 | 3.797 | 17.7 |
| 23.742 | 3.748 | 24.4 |
| 24.800 | 3.590 | 23.6 |
| 27.120 | 3.288 | 9.1 |
| 28.311 | 3.152 | 11.6 |
| 30.711 | 2.911 | 4.2 |
| 31.458 | 2.844 | 34.9 |
| 33.600 | 2.667 | 7.1 |
| 35.627 | 2.520 | 3.1 |
| 36.204 | 2.481 | 7.3 |
| 41.147 | 2.194 | 2.9 |

EXAMPLES 7-9

In procedures similar to that of Example 1 the following starting materials (weights in grams) were used, resulting in the below listed products:

| | Example | | |
|---|---|---|---|
| | 7 | 8 | 9 |
| Reactants | | | |
| Alumina Trihydrate | 12.1 | 12.1 | 15.6 |
| Potassium Hydroxide | 70.6 | 70.6 | 90.8 |
| Ferrous Ammonium Sulphate | 14.3 | 7.2 | 5.0 |
| Tetramethylammonium Chloride | 15.3 | 15.3 | 39.4 |
| Water | 363 | 363 | 400 |
| Ludox LS | 311 | 311 | 417 |
| Product (Moles) | | | |
| SiO$_2$ | 10.6 | 9.8 | 8.8 |
| K$_2$O/Al$_2$O$_3$ | 0.01 | 0.50 | 0.75 |
| Fe/Al | 0.18 | 0.08 | 0.05 |
| TMA$_2$O/Al$_2$O$_3$ | 0.54 | 0.50 | 0.53 |
| Particle Size (microns) | 1 | 1 | 1 |

The gels for Examples 7 and 8 were heated at 95°-100° C. and the gel for Example 9 was heated at 120° C. for 96 hours. The XRD patterns for the materials of Examples 7, 8 and 9 are presented in Tables VII, VIII and IX, respectively.

EXAMPLE 10

70.6 g potassium hydroxide, 12.1 g alumina and 207.7 g water were mixed and heated with stirring until the alumina dissolved and then cooled to room temperature. To this was then added to 311 g Ludox LS with stirring until the gel so formed appeared homogeneous. A solution of 15.3 g tetramethylammonium chloride in 77.8 g water was then added slowly and with stirring. A solution of 20.4 g ferrous sulphate (FeSO$_4$.5H$_2$O) in 77.8 g water was then added slowly and with stirring. The gel so formed was heated for 281 hours at 100° C. under quiescent conditions.

TABLE VII

| 2θ | d | Height (Arbitrary Units) |
|---|---|---|
| 7.751 | 11.406 | 18.6 |
| 11.733 | 7.542 | 5.3 |
| 13.449 | 6.584 | 9.8 |
| 14.080 | 6.290 | 3.9 |
| 15.538 | 5.703 | 7.0 |
| 19.511 | 4.550 | 16.1 |
| 20.613 | 4.309 | 17.5 |
| 23.422 | 3.798 | 20.1 |
| 23.769 | 3.743 | 35.6 |
| 24.836 | 3.585 | 29.5 |
| 27.102 | 3.290 | 11.7 |
| 28.338 | 3.149 | 15.2 |
| 30.622 | 2.919 | 4.6 |
| 31.458 | 2.844 | 48.3 |
| 33.609 | 2.667 | 10.5 |
| 35.698 | 2.515 | 3.1 |
| 36.222 | 2.480 | 10.3 |
| 39.529 | 2.280 | 2.0 |
| 41.129 | 2.195 | 4.7 |

TABLE VIII

| 2θ | d | Height (Arbitrary Units) |
|---|---|---|
| 7.858 | 11.251 | 23.9 |
| 11.840 | 7.474 | 5.2 |
| 13.547 | 6.536 | 13.3 |
| 14.178 | 6.247 | 4.0 |
| 15.618 | 5.674 | 8.2 |
| 19.600 | 4.529 | 16.3 |
| 20.693 | 4.292 | 23.5 |
| 23.502 | 3.785 | 23.6 |
| 23.849 | 3.731 | 43.2 |
| 24.933 | 3.571 | 30.1 |
| 27.173 | 3.282 | 14.5 |
| 28.409 | 3.142 | 16.2 |
| 30.729 | 2.910 | 5.1 |
| 31.556 | 2.835 | 54.7 |
| 33.662 | 2.662 | 13.2 |
| 36.178 | 2.483 | 11.4 |
| 36.382 | 2.469 | 12.0 |
| 38.364 | 2.346 | 1.1 |
| 39.538 | 2.279 | 3.0 |
| 41.164 | 2.193 | 5.7 |

TABLE IX

| 2θ | d | Height (Arbitrary Units) |
|---|---|---|
| 7.742 | 11.419 | 19.6 |
| 11.724 | 7.548 | 4.6 |
| 13.458 | 6.579 | 11.7 |
| 14.089 | 6.286 | 3.3 |
| 15.547 | 5.700 | 6.0 |
| 19.529 | 4.545 | 13.2 |
| 20.613 | 4.309 | 18.7 |
| 23.404 | 3.801 | 17.2 |
| 23.769 | 3.743 | 37.5 |
| 24.871 | 3.580 | 27.3 |
| 27.084 | 3.292 | 12.0 |
| 28.364 | 3.146 | 14.3 |
| 30.631 | 2.919 | 4.4 |
| 31.502 | 2.840 | 44.0 |
| 33.209 | 2.698 | 1.2 |
| 33.582 | 2.669 | 10.8 |
| 35.716 | 2.514 | 2.6 |
| 36.124 | 2.486 | 8.2 |
| 36.311 | 2.474 | 9.5 |
| 38.329 | 2.348 | 1.1 |
| 39.476 | 2.283 | 2.1 |
| 41.111 | 2.196 | 4.6 |

TABLE X

| 2θ | d | Height (Arbitrary Units) |
|---|---|---|
| 7.804 | 11.328 | 5.1 |
| 11.769 | 7.519 | 2.3 |
| 13.502 | 6.558 | 2.7 |
| 14.098 | 6.282 | 2.4 |
| 15.618 | 5.674 | 1.3 |
| 19.520 | 4.548 | 6.6 |
| 20.622 | 4.307 | 4.9 |
| 23.813 | 3.736 | 11.9 |
| 24.338 | 3.657 | 8.1 |
| 24.871 | 3.580 | 9.8 |
| 26.302 | 3.388 | 2.1 |
| 27.191 | 3.280 | 3.8 |
| 28.329 | 3.150 | 4.5 |
| 30.729 | 2.910 | 2.2 |
| 31.502 | 2.840 | 16.4 |
| 33.724 | 2.658 | 4.3 |
| 34.631 | 2.590 | 2.9 |
| 36.222 | 2.480 | 3.6 |
| 41.298 | 2.186 | 1.6 |

The product so formed was filtered from the mother liquor and washed as described in Example 1.

X-ray analyses of this crystalline product proved the crystals to have the diffraction pattern substantially that listed in Table X. X-ray analysis of the crystalline product after drying for about 16 hours at 120° C. was substantially that listed in Table X(a).

TABLE X(a)

| 2θ | d | Height (Arbitrary Units) |
|---|---|---|
| 7.538 | 11.728 | 3.913 |
| 11.520 | 7.681 | 2.991 |
| 13.280 | 6.667 | 4.695 |
| 13.884 | 6.378 | 2.055 |
| 15.387 | 5.759 | 3.664 |
| 19.360 | 4.585 | 9.988 |
| 20.462 | 4.340 | 10.184 |
| 23.609 | 3.768 | 19.088 |
| 24.667 | 3.609 | 15.446 |
| 26.987 | 3.304 | 6.846 |
| 28.169 | 3.168 | 8.963 |
| 30.560 | 2.925 | 2.638 |
| 31.307 | 2.857 | 26.339 |
| 33.467 | 2.678 | 5.007 |
| 36.044 | 2.492 | 6.618 |

Chemical analyses showed this material to have the following molar composition (alumina taken as 1.0):

$SiO_2/Al_2O_3 = 12.0$ $K_2O/Al_2O_3 = 0.8$ $Fe/Al = 0.26$ $TMA_2O/Al_2O_3 = 0.516$

The particle size as determined by scanning electron microscopy was about 0.1 microns.

EXAMPLE 11

282.4 g potassium hydroxide, 48.4 g alumina and 830.8 g water were mixed and heated with stirring until the alumina dissolved and then cooled to room temperature. To this was then added 1244 g Ludox LS with stirring until the gel so formed appeared homogeneous. A solution of 61.2 g tetramethylammonium chloride in 311.2 g water were added slowly and with stirring. A solution of 81.6 g ferrous sulphate (FeSO$_4$.5H$_2$O) in 311.2 g water was then added slowly and with stirring.

The gel so formed was heated under stirred, reflux conditions and atmospheric pressure in a glass flask. Crystallization was complete after ~19 days.

The product so formed was filtered from the mother liquor and washed as described in Example 1.

TABLE XI

| 2θ | d | Height (Arbitrary Units) |
|---|---|---|
| 7.742 | 11.419 | 10.4 |
| 11.751 | 7.531 | 3.5 |
| 13.449 | 6.584 | 5.4 |
| 14.071 | 6.294 | 2.4 |
| 15.547 | 5.700 | 4.0 |
| 19.538 | 4.543 | 8.7 |
| 20.631 | 4.305 | 9.8 |
| 23.440 | 3.795 | 12.2 |
| 23.778 | 3.742 | 20.3 |
| 24.853 | 3.582 | 18.5 |
| 27.138 | 3.286 | 6.9 |
| 28.364 | 3.146 | 9.1 |
| 30.738 | 2.909 | 3.0 |
| 31.458 | 2.844 | 28.7 |
| 33.591 | 2.668 | 6.8 |
| 34.596 | 2.593 | 2.3 |
| 35.760 | 2.511 | 2.6 |
| 36.116 | 2.487 | 6.3 |
| 39.582 | 2.277 | 2.0 |
| 41.164 | 2.193 | 3.2 |

X-ray analysis of this crystalline product proved the crystals to have the diffraction pattern substantially that listed in Table XI. Chemical analyses showed this material to have the following composition:

$SiO_2 = 12.0$ $K_2O/Al_2O_3 = 0.74$ $Fe/Al = 0.30$ $TMA_2O/Al_2O_3 = 0.54$

The water content was not determined. The particle size as determined by electron microscopy was about 0.1 micron and the adsorption capacity for cyclohexane at 20° C., 20 mmHg was 5.7 weight percent.

EXAMPLE 12

In a procedure similar to that in Example 10 the following starting materials (weights in grams) were used.

| Reactants | |
|---|---|
| Alumina Trihydrate | 15.6 |
| Potassium Hydroxide | 90.8 |
| Ferrous Ammonium Sulphate | 15 |
| Tetramethylammonium Chloride | 19.7 |
| Water | 347 |
| Ludox LS | 400 |

This gel was heated under quiescent conditions for 144 hours at 120° C. The product as produced has an x-ray diffraction pattern substantially that listed in Table XII. Chemical analyses showed this material to have the following molar composition (alumina taken as 1.0):

$SiO_2/Al_2O_3 = 10.9$ $K_2O/Al_2O_3 = 0.8$

Fe/Al=0.33

TMA$_2$O/Al$_2$O$_3$=0.51

The water content was not determined. The particle size as determined by electron microscopy was about 1 micron.

TABLE XII

| 2θ | d | Height (Arbitrary Units) |
|---|---|---|
| 8.009 | 11.039 | 20.2 |
| 11.964 | 7.397 | 4.8 |
| 13.689 | 6.469 | 12.4 |
| 14.320 | 6.185 | 3.8 |
| 15.778 | 5.617 | 7.5 |
| 19.742 | 4.497 | 15.0 |
| 20.836 | 4.263 | 22.4 |
| 23.653 | 3.761 | 21.2 |
| 24.000 | 3.708 | 42.3 |
| 25.084 | 3.550 | 30.6 |
| 26.462 | 3.368 | 1.6 |
| 27.316 | 3.265 | 14.4 |
| 28.569 | 3.124 | 16.7 |
| 30.862 | 2.897 | 6.2 |
| 31.698 | 2.823 | 53.0 |
| 33.813 | 2.651 | 12.4 |
| 35.911 | 2.501 | 3.6 |
| 36.320 | 2.473 | 11.4 |
| 36.507 | 2.461 | 11.8 |
| 39.698 | 2.270 | 2.9 |
| 41.333 | 2.184 | 6.7 |

EXAMPLES 13-19

In procedures similar to that of Example 1 the starting materials (weights in grams) in Table A were used. The XRD pattens of the materials produced in Examples 13-19 are presented in Tables XIII, XIV, XV, XVI, XVII, XVIII and XIX, respectively.

TABLE XIII

| 2θ | d | Height (Arbitrary Units) |
|---|---|---|
| 7.876 | 11.226 | 21.9 |
| 11.867 | 7.458 | 5.5 |
| 13.582 | 6.519 | 11.3 |
| 14.204 | 6.235 | 4.1 |
| 15.680 | 5.651 | 7.1 |
| 19.644 | 4.519 | 16.3 |
| 20.747 | 4.281 | 20.9 |
| 23.547 | 3.778 | 19.2 |
| 23.911 | 3.721 | 37.6 |
| 25.004 | 3.561 | 29.0 |
| 27.227 | 3.275 | 12.0 |
| 28.498 | 3.132 | 15.1 |
| 30.782 | 2.905 | 4.4 |
| 31.627 | 2.829 | 46.6 |
| 33.751 | 2.656 | 9.8 |
| 35.849 | 2.505 | 2.6 |
| 36.436 | 2.466 | 10.0 |
| 39.671 | 2.272 | 2.1 |
| 41.298 | 2.186 | 5.1 |

TABLE XIV

| 2θ | d | Height (Arbitrary Units) |
|---|---|---|
| 7.751 | 11.406 | 17.3 |
| 11.733 | 7.542 | 4.2 |
| 13.440 | 6.588 | 9.1 |
| 14.080 | 6.290 | 3.0 |
| 15.547 | 5.700 | 6.0 |
| 19.529 | 4.545 | 13.2 |
| 20.604 | 4.311 | 16.9 |
| 23.422 | 3.798 | 15.4 |
| 23.778 | 3.742 | 32.1 |
| 24.862 | 3.581 | 23.3 |
| 27.102 | 3.290 | 9.7 |
| 28.364 | 3.146 | 11.3 |
| 30.667 | 2.915 | 3.5 |
| 31.484 | 2.841 | 38.2 |
| 33.609 | 2.667 | 8.7 |
| 35.773 | 2.513 | 2.0 |
| 36.329 | 2.473 | 7.6 |
| 39.502 | 2.281 | 1.9 |
| 41.129 | 2.195 | 3.8 |

TABLE XV

| 2θ | d | Height (Arbitrary Units) |
|---|---|---|
| 7.796 | 11.341 | 11.6 |
| 11.769 | 7.519 | 3.7 |
| 13.511 | 6.553 | 6.7 |
| 14.089 | 6.286 | 3.2 |
| 15.591 | 5.684 | 4.0 |
| 19.556 | 4.539 | 11.4 |
| 20.676 | 4.296 | 11.7 |
| 23.511 | 3.784 | 15.0 |
| 23.849 | 3.731 | 23.2 |
| 24.444 | 3.641 | 4.7 |
| 24.916 | 3.574 | 20.1 |
| 25.867 | 3.444 | 1.5 |
| 27.173 | 3.282 | 8.2 |
| 28.400 | 3.143 | 10.8 |
| 30.782 | 2.905 | 3.9 |
| 31.547 | 2.836 | 30.9 |
| 33.689 | 2.660 | 7.3 |
| 34.836 | 2.575 | 2.2 |
| 35.813 | 2.507 | 2.5 |
| 36.311 | 2.474 | 7.0 |
| 39.591 | 2.276 | 1.8 |
| 41.280 | 2.187 | 2.8 |

TABLE XVI

| 2θ | d | Height (Arbitrary Units) |
|---|---|---|
| 7.716 | 11.458 | 15.1 |
| 11.698 | 7.565 | 5.0 |
| 13.413 | 6.601 | 8.5 |
| 14.053 | 6.302 | 3.2 |
| 15.520 | 5.709 | 4.8 |
| 19.493 | 4.554 | 11.9 |
| 20.587 | 4.314 | 13.9 |
| 23.440 | 3.795 | 18.8 |
| 23.742 | 3.748 | 26.7 |
| 24.836 | 3.585 | 24.5 |
| 27.084 | 3.292 | 8.3 |
| 28.320 | 3.151 | 11.6 |
| 30.311 | 2.949 | 1.1 |
| 31.449 | 2.845 | 34.8 |
| 33.591 | 2.668 | 6.7 |
| 36.284 | 2.476 | 7.6 |
| 39.564 | 2.278 | 1.9 |
| 41.138 | 2.194 | 2.9 |

TABLE XVII

| 2θ | d | Height (Arbitrary Units) |
|---|---|---|
| 7.796 | 11.341 | 15.5 |
| 11.840 | 7.474 | 4.4 |
| 13.529 | 6.545 | 9.0 |
| 14.089 | 6.286 | 2.9 |
| 15.653 | 5.661 | 5.8 |
| 19.627 | 4.523 | 14.8 |
| 20.720 | 4.287 | 16.6 |
| 23.564 | 3.775 | 20.6 |
| 23.867 | 3.728 | 29.8 |
| 24.951 | 3.569 | 26.4 |
| 27.236 | 3.274 | 9.7 |

TABLE XVII-continued

| 2θ | d | Height (Arbitrary Units) |
|---|---|---|
| 28.436 | 3.139 | 13.4 |
| 30.827 | 2.901 | 3.8 |
| 31.564 | 2.834 | 41.4 |
| 33.733 | 2.657 | 9.1 |
| 34.444 | 2.604 | 1.4 |
| 35.013 | 2.563 | 1.9 |
| 35.822 | 2.507 | 3.8 |
| 36.293 | 2.475 | 10.7 |
| 36.489 | 2.462 | 9.3 |
| 37.200 | 2.417 | 2.0 |
| 39.244 | 2.296 | 1.8 |
| 39.627 | 2.274 | 2.8 |
| 41.253 | 2.188 | 3.7 |

TABLE XVIII

| 2θ | d | Height (Arbitrary Units) |
|---|---|---|
| 7.707 | 11.471 | 9.1 |
| 11.698 | 7.565 | 2.9 |
| 13.413 | 6.601 | 4.9 |
| 14.036 | 6.310 | 2.4 |
| 15.520 | 5.709 | 3.1 |
| 19.493 | 4.554 | 7.8 |
| 20.587 | 4.314 | 8.8 |
| 23.440 | 3.795 | 10.7 |
| 23.751 | 3.746 | 18.3 |
| 24.818 | 3.587 | 16.2 |
| 27.111 | 3.289 | 6.0 |
| 28.329 | 3.150 | 7.7 |
| 30.667 | 2.915 | 2.6 |
| 31.449 | 2.845 | 24.1 |
| 33.618 | 2.666 | 6.4 |
| 36.124 | 2.486 | 6.6 |
| 39.458 | 2.284 | 2.0 |
| 41.111 | 2.196 | 2.9 |

TABLE XIX

| 2θ | d | Height (Arbitrary Units) |
|---|---|---|
| 7.911 | 11.175 | 22.0 |
| 11.884 | 7.447 | 5.7 |
| 13.609 | 6.507 | 12.0 |
| 14.249 | 6.216 | 4.6 |
| 15.689 | 5.648 | 7.8 |
| 19.671 | 4.513 | 17.3 |
| 20.764 | 4.278 | 22.2 |
| 23.600 | 3.770 | 23.0 |
| 23.938 | 3.717 | 38.3 |
| 25.013 | 3.560 | 33.5 |
| 27.253 | 3.272 | 12.4 |
| 28.507 | 3.131 | 16.6 |
| 30.809 | 2.902 | 4.8 |
| 31.627 | 2.829 | 40.1 |
| 32.613 | 2.746 | 2.0 |
| 33.769 | 2.654 | 11.4 |
| 34.489 | 2.600 | 1.3 |
| 35.662 | 2.518 | 15.6 |
| 36.293 | 2.475 | 11.6 |
| 38.880 | 2.316 | 15.1 |
| 39.644 | 2.273 | 3.7 |
| 41.324 | 2.185 | 5.0 |

TABLE A

| Reactants | 13 | 14 | 15 | 16 | 17 | 18 | 19 |
|---|---|---|---|---|---|---|---|
| Alumina Trihydrate | 7.8 | 15.6 | 7.8 | 12.1 | 15.6 | 15.6 | 15.6 |
| Potassium Hydroxide | 45.4 | 90.8 | 45.4 | 70.6 | 90.8 | 90.8 | 90.8 |
| Tetramethylammonium Chloride | 9.9 | 19.7 | 9.9 | 15.3 | 19.7 | 19.7 | 19.7 |
| Water | 233.5 | 300 | 233.5 | 363 | 347 | 347 | 347 |
| Ludox LS | 200 | 400 | 200 | 311 | 400 | 400 | 400 |
| Chromic Nitrate ($Cr(NO_3)_3 \cdot 9H_2O$) | 9.3 | — | — | — | — | — | — |
| Chromium Trichloride ($CrCl_3 \cdot 6H_2O$) | — | 27 | — | — | — | — | — |
| Manganous Chloride | — | — | 9.3 | — | — | — | — |
| Ferric Nitrate | — | — | — | 29.6 | — | — | — |
| Cobaltous Chloride ($CoCl_2 \cdot 6H_2O$) | — | — | — | — | 22.4 | — | — |
| Nickel Sulphate ($NiSO_4 \cdot 6H_2O$) | — | — | — | — | — | 24.7 | — |
| Copper Sulphate ($CuSO_4 \cdot 5H_2O$) | — | — | — | — | — | — | 23.5 |
| Reaction Temperature, °C. | 100 | 120 | 100 | 100 | 100 | 100 | 100 |
| Products |  |  |  |  |  |  |  |
| $SiO_2/Al_2O_3$ | 11.1 | 11.8 | 14.1 | 12.4 | 9.61 | 9.6 | 9.6 |
| $K_2O/Al_2O_3$ | 0.7 | 0.8 | 0.74 | 0.80 | 0.62 | 0.52 | 0.60 |
| *Me/Al | 0.17 | 0.37 | 0.18 | 0.31 | 0.25 | 0.40 | 0.49 |
| $TMA_2O/Al_2O_3$ | 0.56 | 0.46 | 0.6 | 0.6 | 0.42 | 0.42 | 0.54 |
| Particle Size (microns) | 1.0 × 0.5 | 1.2 × 0.5 | 0.75 × 0.3 | 1.0 × 0.5 | (3) | (4) | (5) |
| Cyclohexane adsorption capacity (weight %)(1) | 3.1 | 6.3(2) | 4.0 | — | 7.9 | — | 5.2 |

*Me = transition metal
(1) 20° C., 20 mmHg
(2) after calcination on ammonium exchange
(3) mixtures of ~0.1 micron (spheres) and ~0.1 × 0.25 micron (cylinders)
(4) mixtures of ~0.1 micron (spheres) and 0.5 micron (hexagonal prisms)
(5) ~1.0 micron (cylinders)

EXAMPLE 20

This Example illustrates the selective removal of iron from Fe-T-IOZ-5, such as prepared in Example 1. 32.5 g of Fe-T-IOZ-5 containing 2.9 weight percent iron was slurried in 2 L of water and placed in a 5 L flask. 5.1 g EDTA-H$_4$ (ethylenediamine tetra-acetic acid) was put into a Soxhlet thimble which allowed the slow addition of EDTA-H$_4$ (after the method of dealumination described by Kerr G. T., *J. Phys. Chem.* 72 21594 (1968)). This was allowed to reflux under stirred conditions until all of the EDTA-H$_4$ was added to the flask. The product so produced after heating an additional 24 hours was washed four times with boiling water and found to contain 1.13 weight percent iron. The silica/alumina ratio remained unchanged (with experimental error) as shown below:

| Components | Reactant | Product |
|---|---|---|
| Wt. % Fe | 2.93 | 1.125 |
| $SiO_2/Al_2O_3$ | 13.0 | 13.0 |
| $K_2O/Al_2O_3$ | 0.57 | 0.42 |

EXAMPLES 21-24

In procedures identical for that described in Example 20 the iron content of "as prepared" Fe-IOZ-5 and dealuminated Fe-T-IOZ-5 was reduced as shown in Table B.

Figure 7:
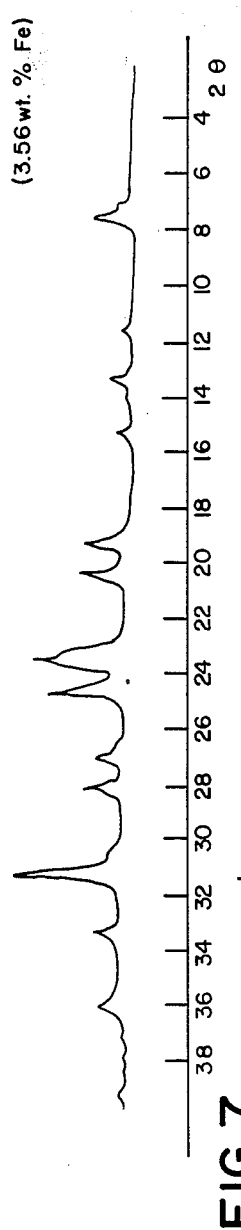
FIGS. 7, 8 and 9 presents XRD patterns of Iron IOZ-5 after various degrees of iron complexation with EDTA-H$_4$.
Figure 8:
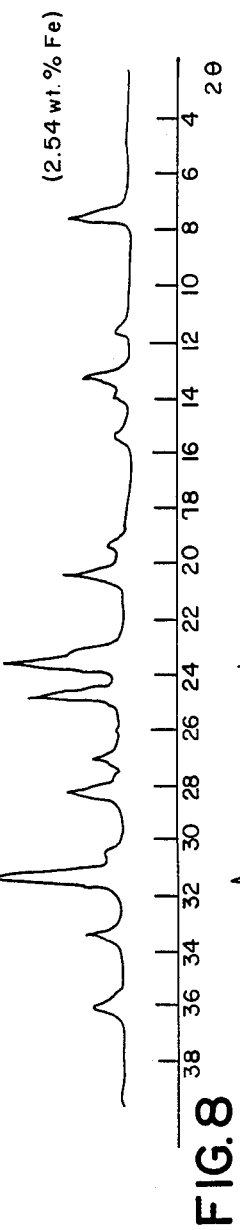
Figure 9:
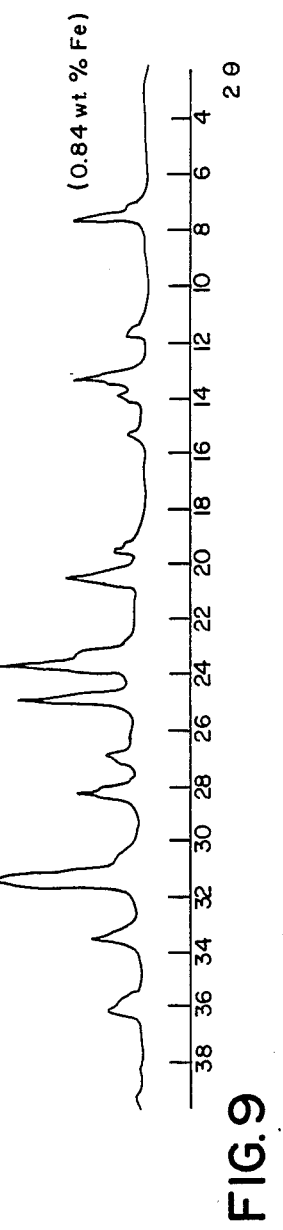

FIGS. 7, 8 and 9 shows XRD patterns of the reactant from Example 23 and the products of Examples 23 and 24 respectively, all of which have varying levels of iron. The figures show that iron removal does not result on loss of crystallinity.

TABLE B
IRON REMOVAL FROM Fe-IOZ-5

| | EXAMPLE | | | |
|---|---|---|---|---|
| Reactant | 21 | 22 | 23 | 24 |
| % Fe | 1.8 | 2.6 | 3.56 | 2.5 |
| $SiO_2/Al_2O_3$* | 17 | 13 | 12 | 12 |
| $K_2O/Al_2O_3$ | 0.43 | 0.26 | 0.74 | 0.57 |
| Wt. of Reactant (g) | 17.3 | 11.7 | 89.3 | 66.4 |
| Wt. of EDTA-H$_4$ (g) | 2.7 | 2.3 | 14.1 | 10.4 |
| Product | | | | |
| % Fe | 0.6 | 0.67 | 2.54 | 0.84 |
| $SiO_2/Al_2O_3$* | 18 | 14 | 12 | 12.5 |
| $K_2O/Al_2O_3$ | 0.35 | 0.35 | 0.57 | 0.38 |

*Estimated error in $SiO_2/Al_2O_3$ ±1 (measured by XRF spectroscopy)

EXAMPLE 25

In an illustration of iron and aluminum removal, the product of Example 5 was refluxed with hydrochloric acid for 1 hour. Table C shows the chemical composition of the products so obtained.

TABLE C

| Acid Concentration | Wt. % Fe | $SiO_2/Al_2O_3$ | $K_2/Al_2O_3$ |
|---|---|---|---|
| (Molar) | | | |
| (Reactant) | 5.2 | 13.5 | 1.0 |
| (Product) | | | |
| 1.0 | 0.1 | 21 | 0.26 |
| 1.5 | 0.1 | 20 | 0.20 |
| 2.0 | 0.1 | 27 | 0.20 |

EXAMPLE 26

A catalyst, the base of which was prepared as described in Example 5, was treated as described in Example 25 (iron and aluminum removal) and then tested for catalytic dewaxing of a waxy raffinate. Properties of the raffinate are listed in Table E.

Material as prepared in Example 5 was refluxed with 1.5M hydrochloric acid solution (15 g solution/g catalyst base) for 1 hour. This was then washed free of chloride, dried at 120° C. for 4 hours, calcined in air at 500° C. for 1 hour and then 600° C. for 1 hour. Chemical analysis showed this material to have the composition:

$SiO_2/Al_2O_3 = 20$ $K_2O/Al_2O_3 = 0.2$ 0.1 Weight % Iron

This base was ion exchanged with palladium as palladium tetraamine dichloride at room temperature and pH ~ 10. The loading level of palladium was 0.3 weight percent. This catalyst was calcined in air at 500° C. for 1 hour after loading with Pd. This catalyst was reduced in a stream of pure hydrogen at 0.34 MPa, flow rate of 107 m$^3$ API/m$^3$, and heated at 25° C./hour intervals from room temperature to 100° C., maintained at 100° C. for 1 hour and then heated at 50° C./hour to 400° C. and maintained at 400° C. for 1 hour.

The catalytic dewaxing test was performed under the conditions noted in Table D below:

TABLE D

| | |
|---|---|
| Space velocity V/H/V | 1.0 |
| Pressure MPa | 4.1 |
| Treat Gas Rate m$^3$API/m$^3$ | 622 (100% Hydrogen) |
| Operating Mode | Upflow |
| Temperature | Variable |
| Feed | Waxy Raffinate (Table E) |

TABLE E

| | |
|---|---|
| Refractive Index at 60° C. | 1.4678 |
| °API at 60° F. | 31.4 |
| Density at 15° C. | 0.8646 |
| Viscosity, cSt at 40° C. | 21.87 |
| Viscosity, cSt at 100° C. | 4.35 |
| Basic Nitrogen, wppm | 9.4 |
| Total Nitrogen, wppm | 21 |
| Sulphur, Wt. % | 0.18 |
| Pour Point, °C. | +33 |

Figure 11:
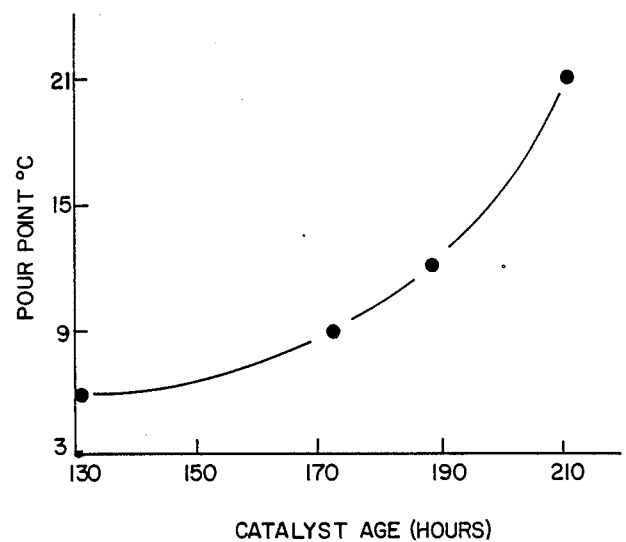
FIGS. 11 and 12 shows the relationship between pour point and catalyst age in a dewaxing process employing an IOZ-5 zeolite of reduced iron content which has been impregnated with palladium.
Figure 12:
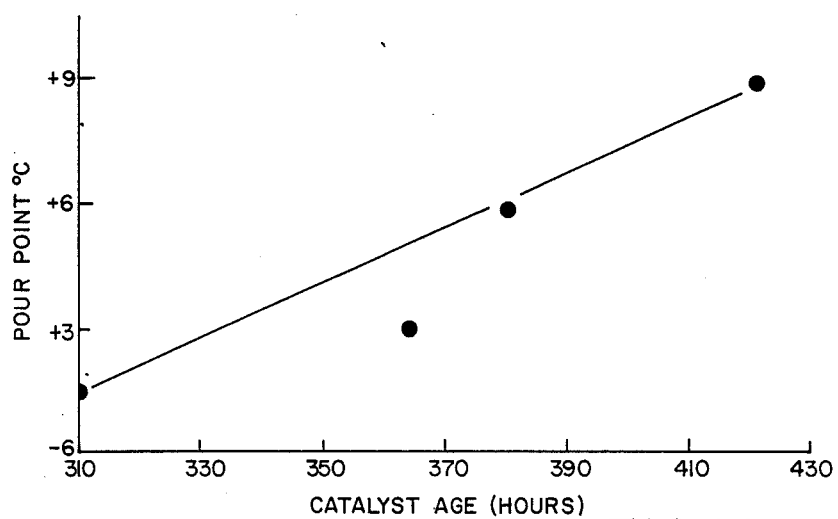

FIGS. 11 and 12 illustrate that this catalyst is active for pour point reduction of this feedstock.

EXAMPLE 27

A catalyst, the base of which was prepared as described in Example 11, was treated as described below and then tested for activity in dewaxing various waxy hydrocarbon feedstocks.

Material as prepared in Example 11 was calcined under shallow bed conditions in air at 350° C. for 1 hour, 450° C. for 1 hour, 550° C. for 2 hours and 600° C. for 1 hour. 89.3 g of this material was slurried with 2 L of water and stirred under reflux conditions for 3 days. 14.1 g ethylenediamine tetra-acetic acid were added slowly over the initial 2 days of the reflux period. This product was washed by boiling in water (>10 vol. excess water) for 1 hour and centrifuging to separate from the wash liquid. This washing step was repeated three times.

This product was calcined at 350° C. and 450° C. for 1 hour each, 550° C. for 2 hours and 600° C. for 1 hour.

The treatment with EDTA-H$_4$ and the washing procedure was then repeated and the product dried at 120° C. for 4 hours. It was then calcined at 550° C. for 1 hour.

64.1 g of this product was treated with 1 liter of 0.5M ammonium nitrate solution under stirred reflux conditions at atmospheric pressure for 2 hours. The product was washed free of excess nitrate.

Chemical analyses showed this material to have the following major composition (alumina taken as 1.0):

$SiO_2/Al_2O_3 = 12.8$ $K_2O/Al_2O_3 = 0.21$ 0.4 weight percent iron

This catalyst base was ion exchanged with platinum as platinum tetraamine dichloride at room temperature. The loading level of platinum was 0.5 weight percent. This catalyst was dried at 120° C. and calcined at 425° C. and 550° C. for 1 hour in air and reduced under substantially the same conditions as described in Example 26.

The catalytic dewaxing test was performed in the downflow mode under the conditions listed in Table G. The feedstock properties of feeds used in this Example are listed in Table F.

TABLE F

FEEDSTOCK PROPERTIES

| Feedstock | A | B | C |
|---|---|---|---|
| °API @ 60° F. | 35.3 | 32.1 | 32.4 |
| Density @ 15° C. | 0.8479 | 0.8645 | 0.8629 |
| Total Nitrogen, wppm | 4.7 | 190 | 336 |
| Basic Nitrogen, wppm | — | 60 | 105 |
| Sulphur, Wt. % | 0.048 | 0.22 | 0.27 |
| Pour Point | −9 | +1 | +10 |
| Distillation °C. (D86) | | | |
| i/5 | 285/325 | 204/280 | 290/314 |
| 40/60 | 350/350 | 315/325 | 340/344 |
| 90/FBP+ | 384/— | 349/365 | 361/— |

Where:
Feedstock A is a white oil
Feedstock B is a light atmospheric gas oil from a conventional Western Canadian crude
Feedstock C is a heavy atmospheric gas oil from a conventional Western Canadian crude The data in Table G illustrates that this catalyst is active for reducing the pour point of both the white oil and gas oil feedstocks described.

TABLE G

CATALYST PERFORMANCE

| FEED | A | | B | | | C |
|---|---|---|---|---|---|---|
| Feed Rate V/H/V | 1.0 | 0.5 | 0.5 | 0.5 | 1.0 | 0.5 |
| Treat Gas Rate $m^3API/m^3$ | 553 | 1066 | 1066 | 1066 | 533 | 1066 |
| (100% Pure Hydrogen) | | | | | | |
| Pressure MPa | 4.1 | 2.65 | 2.65 | 4.1 | 4.1 | 4.1 |
| Average Reactor Temperature, °C. | 325 | 425 | 415 | 425 | 450 | 425 |
| Catalyst Age (Days) | 6–11 | 51–53 | 55–57 | 49–51 | 67–69 | 37–38 |
| Distillate (166° C.+) Pour Point (°C.) | −18 | <−42 | −24 | −36 | <−42 | −27 |

EXAMPLE 28

This Example illustrates an advantage for using the material of this invention over normal offretite. A catalyst was prepared from the offretite base, as prepared in Example 3, as follows:

The base was calcined at 425° C., 550° C. and 600° C. in air for 1 hour at each temperature. This was then ammonium exchanged with 0.5M ammonium nitrate solution for 2 hours under stirred reflux conditions. This exchange step was then repeated, after which the base was washed free of nitrate and dried at 100° C. This was then loaded with 0.5 weight percent platinum as platinum tetraamine dichloride by exchange at room temperature. The catalyst formed was then dried at 120° C. and calcined at 425° C. and 550° C. for 1 hour at each temperature in air. The catalyst was then reduced at substantially the same conditions described in Example 26.

The performance of this catalyst with that in Example 27 for the catalytic dewaxing of a light gas oil (Feed B, Table F) are compared in Table H. The table shows that although the catalyst prepared from IOZ-5 is less active than offretite, it produces credits in product quality. Whereas offretite gives naphtha of low commercial value (Br No. 3 to 4), the IOZ-5 catalyst produces high value naphtha (Br No. >90). Further, the offretite catalyst consumes 100% more hydrogen than that of the IOZ-5 catalyst for identical pour point reduction.

TABLE H

COMPARISON OF OFFRETITE AND IOZ-5 (IRON FREE 0.5 WT. % Pt ON BOTH CATALYSTS
Feed - Feed B

| Catalyst | Offretite | IOZ-5 |
|---|---|---|
| Particle Size ( ) | 1–2 | <0.1 |
| Silica/Alumina | 10 | 14 |
| Feed Rate V/H/V | 1.0 | 0.5 |
| Treat Gas Rate $m^3API/m^3$ | 1066 | 1066 |
| (100% Pure Hydrogen) | | |
| Pressure MPa | 4.1 | 4.1 |
| Reactor Temp., °C. | 400 | 423 |
| $C_1$–$C_4$, Wt. %[1] (saturated) | 9.5 | 8.1 |
| Naphtha ($C_5$-166° C.+) | | |
| Yield | 5.5 | 6.9 |
| Br. No. | 3–4 | >90 |
| Distillate (166° C.+) | | |
| Yield, Wt. %[1] | 85 | 85 |
| Pour, °C. | −33 | −33 |
| $H_2$ Consumption $m^3API/m^3$ | 30–35 | 18 |

[1]ASTM D86 yields

EXAMPLE 29

This Example illustrates a further advantage for using the material of this invention over normal offretite.

The catalyst in Example 27 (IOZ-5 [iron free]) was tested for dewaxing the light gas oil (Feed B, Table F) under the conditions listed below in Table J. The pour point of the feed was reduced from +1° to −21° C. without apparent activity loss. Under these same conditions a catalyst made from normal offretite, for example that described in Example 28, was found to deactivate very quickly as a result of "coking".

TABLE J

Catalyst Performance

| FEED | B |
|---|---|
| Feed rate v/h/v | 0.52 |
| Treat gas rate $m^3API/m^3$ | 1066 |
| (100% pure hydrogen) | |
| Pressure MPa | 1.25 |
| Average Reactor Temperature (°C.) | 415 |
| Catalyst Age (days) | 61–63 |
| Distillate Pour Point (°C.) (166° C.+) | −21 |

EXAMPLE 30

This example illustrates a further advantage for using the material in this invention of normal offretite.

The catalyst in Example 27 (IOZ-5 [iron free]) was tested for dewaxing of a light gas oil (Feed B, Table F). During the test the catalyst was operated at very low treat gas rates of 24–56 m²API/m³ for 16 hours. Upon re-establishing the conditions listed in Table K the catalyst reduced the Feed B pour point from +1° C. to −42° C. After this period the color of the products was dark for some time, even though the pour point was excellent. As the test progressed the color improved to that before the low gas rate test. Under conditions of this low gas rate test the catalyst in Example 28, made from a normal offretite, was found to deactivate quickly due to "coking". This catalyst could only be reactivated by first burning off the coke and re-reducing as described in Example 26.

This example illustrates that the catalyst of the current invention can tolerate much more severe conditions than a catalyst made from offretite.

TABLE K

| CATALYST PERFORMANCE | |
| --- | --- |
| FEED | B (+1° C. Pour Point) |
| Feed rate v/h/v | 1.0 |
| Treat gas rate m³API/m³ | 533 |
| (100% pure hydrogen) | |
| Pressure MPa | 4.1 |
| Average Reactor Temperature (°C.) | 450 |
| Catalyst Age (Days) | 67–69 |
| Distillate Pour Point (°C.) | −42 |
| (166° C.+) | |

What is claimed is:

1. A process for dewaxing a hydrocarbon feedstock containing paraffins which comprises contacting the feedstock with a catalyst comprising a transition metal alumino-silicate IOZ-5 which has had the transition metal substantially extracted therefrom and having the x-ray diffraction pattern substantially that set forth in Table I and having a silica:alumina ratio of at least 5:1, and a metal hydrogenation component under dewaxing conditions.

2. A process according to claim 1 wherein the crystalline alumino-silicate has a silica:alumina ratio of at least 8:1.

3. A process according to claim 1 in which the feedstock includes aromatic components in addition to the paraffins.

4. A process according to claim 3 in which the proportion of aromatic components is from 0 to 50 weight percent of the feedstock.

5. A process according to claim 2 in which the IOZ-5 has a silica/alumina ratio of at least 12:1.

6. A process according to claim 1 in which the hydrogenation component comprises a metal, oxide or sulfide of Group VIII of the Periodic Table.

7. A process according to claim 6 in which the hydrogenation component comprises platinum or palladium.

8. A process according to claim 1 in which the feedstock is contacted with the catalyst in the presence of hydrogen at a temperature from about 200° C. to about 550° C., a pressure from about atmospheric to about 18 MPa, and a space velocity from about 0.1 to about 20 v/v/h.

9. A process according to claim 8 in which the feedstock is contacted with catalyst in the presence of hydrogen at a temperature from about 250° C. to about 480° C. and a pressure from about 1.2 to about 10 MPa and a space velocity from about 0.1 to about 10 v/v/h.

* * * * *